United States Patent [19]

Baker

[11] Patent Number: 5,415,558

[45] Date of Patent: May 16, 1995

[54] BOLTED ELECTRICAL CONNECTING DEVICE FOR SIMULTANEOUSLY ELECTRICALLY CONNECTING MULTIPLE ELECTRICAL CONDUCTORS

[75] Inventor: David R. Baker, Somerville, Ohio

[73] Assignee: Square D Company, Palatine, Ill.

[21] Appl. No.: 207,337

[22] Filed: Mar. 8, 1994

[51] Int. Cl.⁶ .......................................... H01R 23/00
[52] U.S. Cl. .................................. 439/210; 439/794
[58] Field of Search ............... 439/210, 115, 213, 723, 439/724, 781, 782, 791–794, 811, 812

[56] References Cited

U.S. PATENT DOCUMENTS

| | | | |
|---|---|---|---|
| 3,541,224 | 11/1970 | Joly | 439/213 |
| 4,087,147 | 5/1978 | Silvestris et al. | 439/115 |
| 5,336,100 | 8/1994 | Gabrius et al. | 439/115 |

Primary Examiner—Gary F. Paumen
Attorney, Agent, or Firm—Larry I. Golden; David R. Stacey

[57] ABSTRACT

The present invention provides a means for electrically connecting the corresponding conductors of two adjacent sections of a multi-phase electrical distribution system. The electrical connecting device has a body with two ends and defines a hollow passage connecting the two ends. A conductor clamping plates is slidably received within the passage. A number of electrical connectors are fixedly attached to the clamping plate such that each conductor receiving pocket includes one electrical connector. The clamping plate is selectively movable between a first position and a second position. In the first position electrical conductors from the two adjacent sections may be inserted into the passage at their associated ends of the connecting device. In the second position the conductors are clamped between the passage and the electrical conductors such that conductors from one section sharing common electrical connectors with conductors of the other section are electrically connected together.

38 Claims, 8 Drawing Sheets

BOLTED ELECTRICAL CONNECTING DEVICE FOR SIMULTANEOUSLY ELECTRICALLY CONNECTING MULTIPLE ELECTRICAL CONDUCTORS

FIELD OF THE INVENTION

This invention relates to connections for electrical distribution systems employing cable or round solid conductors and more specifically to a bolted electrical connecting device employing a single bolt for electrically connecting corresponding conductors of adjacent sections of a multi-phase electrical distribution system having round conductors such as the electrical distribution system shown and described in U.S. Pat. No. 5,266,044 and co-pending U.S. patent application Ser. No. 08/085,341, both of which are assigned to the Square D Company, as is the present invention.

BACKGROUND OF THE INVENTION

Electrical connections between two adjacent sections of a multi-phase electrical distribution system having round conductors have been made by spring loaded connectors or by a separate bolted connection for each phase of the distribution system which requires additional space for the connection and electrical insulation required to separate the different phases. While spring loaded connections are easily assembled and may be compact in size, there are times when a bolted connection is preferred or required in an area where limited space is available.

SUMMARY OF THE INVENTION

The single-bolt electrical connecting device of the present invention provides a means for connecting the round conductors of adjacent sections of a multi-phase electrical distribution system within a limited space. The single-bolt connecting device includes a cylindrical body having two conductor clamping plates which are forced apart by a connector bolt. Each of the conductor clamping plates includes a number of electrical connectors which are clamped against the electrical conductors of the two adjacent sections of the electrical distribution system as the clamping plates are forced apart.

Other features and advantages of the invention will become apparent to those skilled in the art upon review of the following detailed description, claims and drawings.

DESCRIPTION OF THE PREFERRED EMBODIMENT

Figure 1:
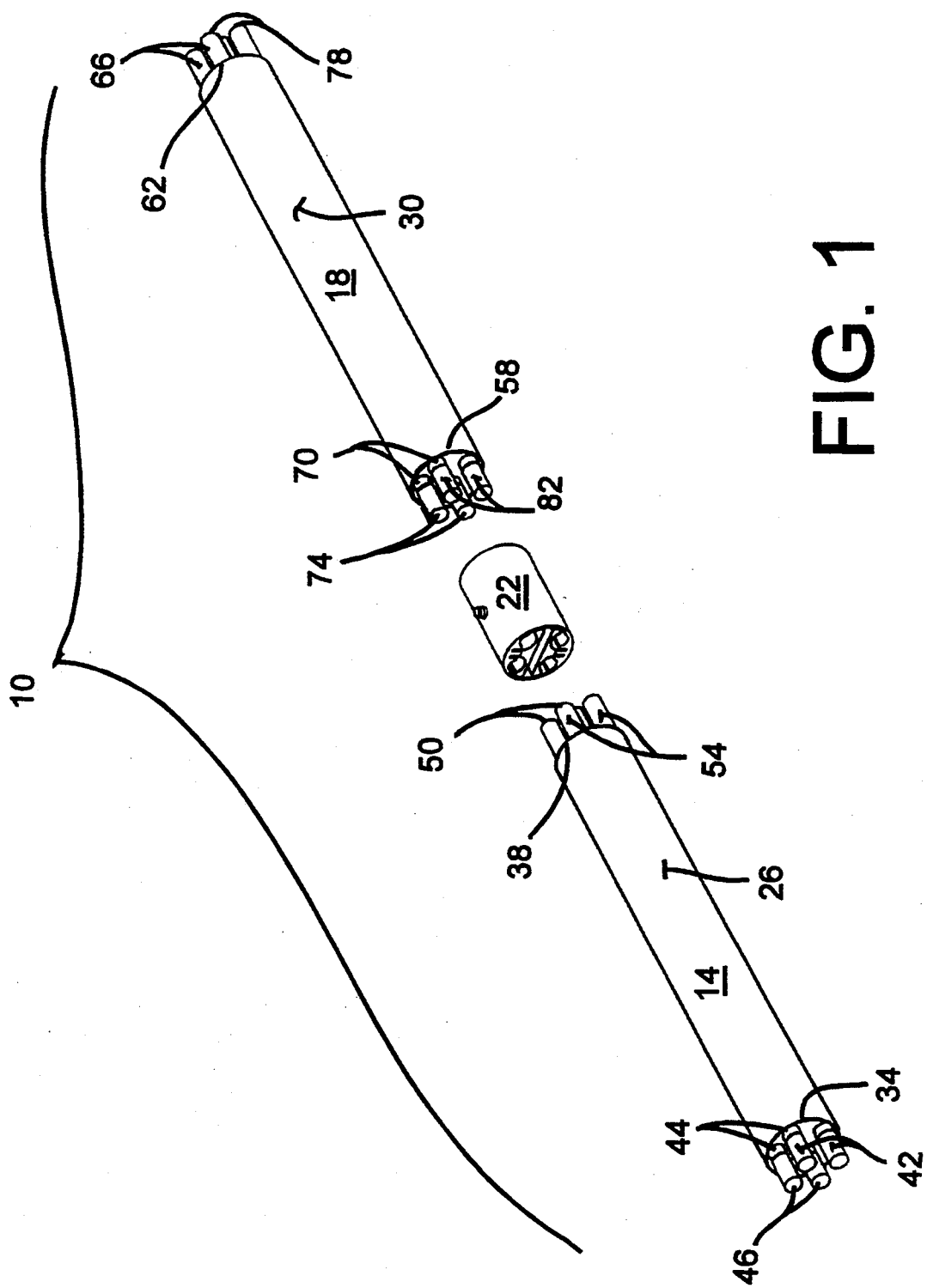
FIG. 1 is an isometric view of two sections of an electrical distribution system with an electrical connecting device constructed in accordance with the present invention between the two sections.

FIG. 1 illustrates the basic components of an electrical distribution system generally indicated by reference numeral 10. The distribution system 10 is comprised of a number of individual sections. Each section is electrically and mechanically connected to an adjacent section thereby forming the electrical distribution system 10. For simplicity, the description of the preferred embodiment will discuss only a first section 14, an adjacent second section 18 and an electrical connecting device 22, intermediate the first and second sections, 14 and 18 respectively. Each of the first and second sections, 14 and 18 respectively, includes a housing, 26 and 30 respectively. The housing 26 of first section 14 has a first end 34 and a second end 38 and encloses a plurality of electrical conductors 42. Generally one conductor 42 is provided for each electrical phase of the distribution system 10. Each conductor 42 is enclosed within an electrically insulating sheath 44. Each conductor 42 has a first end 46 and a second end 50 which extend outwardly from the respective first and second ends 34 and 38 of housing 26. A portion of the insulating sheath 44 is removed from each of the first and second ends, 42 and 46 respectively, to provide an electrical contact surface 54. Similarly, the housing 30 of second section 18 has a first end 58 and a second end 62 and encloses a plurality of electrical conductors 66 with generally one conductor 66 being provided for each electrical phase of the distribution system 10. Each conductor 66 is enclosed within an electrically insulating sheath 70. Each conductor 66 has a first end 74 and a second end 78 which extend outwardly from the respective first and second ends 58 and 62 of housing 30. A portion of the insulating sheath 70 is removed from each of the first and second ends, 74 and 78 respectively, to provide an electrical contact surface 82.

The connecting device 22 provides a means of electrically connecting the conductors 42 of the first section 14 with the corresponding conductors 66 of the second section 18. The electrical connecting device 22 is positioned between two adjacent ends, such as second end 38 of first section 14 and first end 58 of second section 18, such that the electrical contact surfaces 54 of conductors 42 of first section 14 and the electrical contact surfaces 82 of conductors 66 of second section 18 may be received within the electrical connecting device 22.

Figure 2:
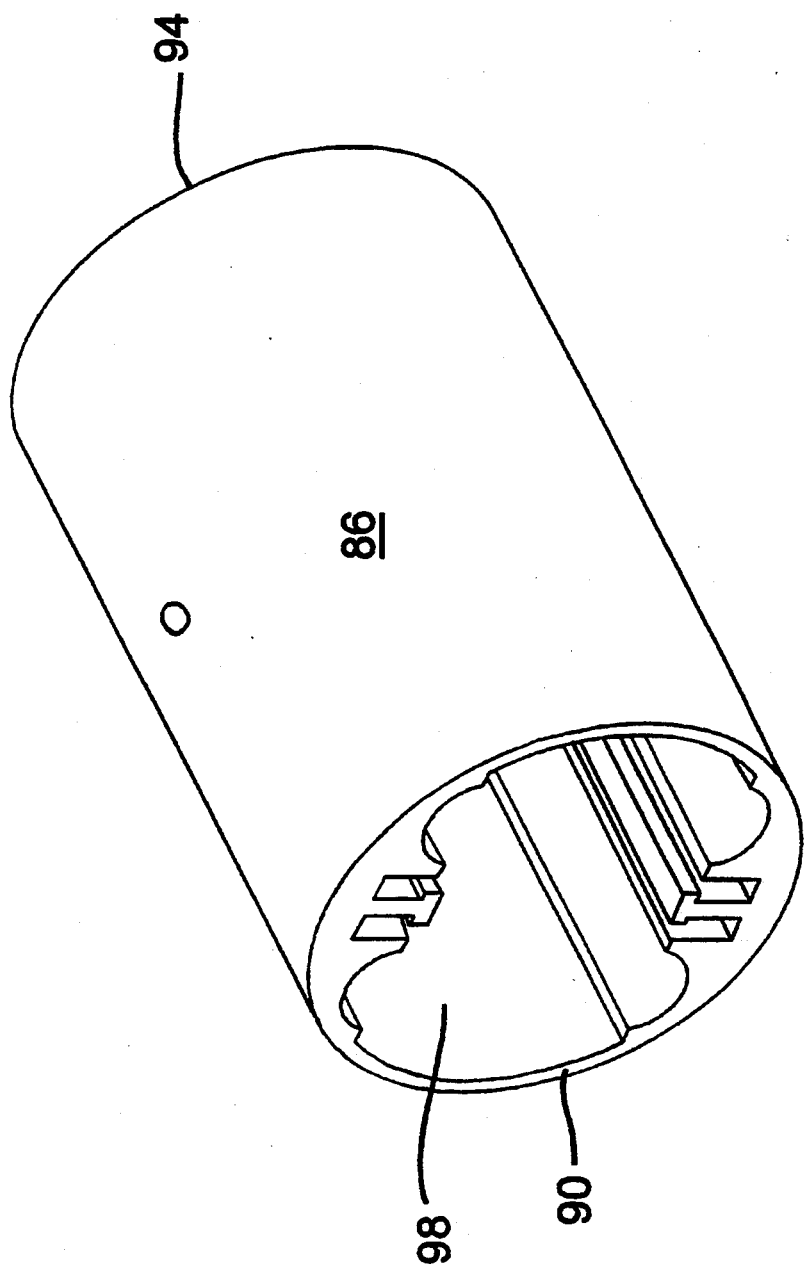
FIG. 2 is an isometric view of the body of an electrical connecting device constructed in accordance with the present invention.

Referring now to FIG. 2, the connecting device 22 of the present invention includes a generally cylindrical body 86 having a first end 90 and a second end 94. The body 86 defines a hollow passage 98 connecting the first and second ends 90 and 94, respectively. The surface of the passage 98 is electrically non-conductive.

Figure 3:
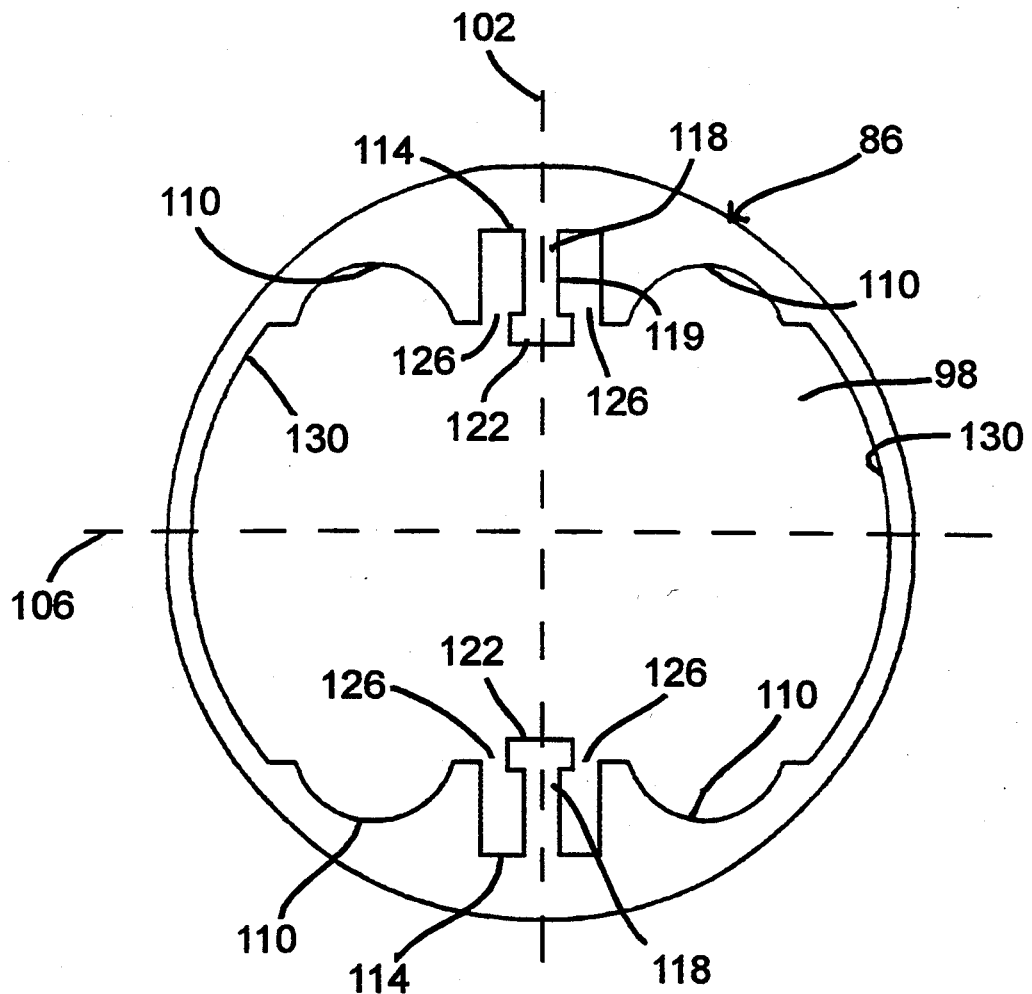
FIG. 3 is an end view of the body of the electrical connecting device of the present invention.

Referring now to FIG. 3, it can be seen that the cross-sectional shape of the passage 98 is such that its shape on one side of a vertical axis 102 or a horizontal axis 106 is a mirror image of the shape on the other side of the vertical axis 102 or horizontal axis 106, respectively. Therefor, the following description will be directed to that portion of the passage 98 above the horizontal axis 106, with the portion below the horizontal axis 106 having identical elements. The shape of the passage 98 above the horizontal axis 106 defines two channels 110, each having a generally semi-circular cross-section, running longitudinally between the first and second ends, 90 and 94, respectively, of the body 86. Adjacent portions of the two channels 110 extend downwardly into the passage 98 and define a generally U-shaped shaped slot 114, having a preselected inside width. The slot 114 is centered on the vertical axis 102 and is open toward the center of the passage 98. The slot 114 separates the two channels the two channels 110, A T-shape retainer 118, having a leg portion 119 and a top portion 122, also centered on the vertical axis 102, extends into the slot 114 such that the top portion 122 of the T-shaped retainer 118, having a width less that the inside width of the slot 114, closes off the open end of the slot 114 leaving a narrow passage 126 on each side of the top portion 122. The slot 114 and T-shaped retainer 118 each run longitudinally between the first and second ends 90 and 94, respectively, of the body 86. The channels 110 above the horizontal axis 106 are spaced apart from the channels 110 below the horizontal axis 106 by a curved surface 130, having a generally circular arc, of the passage 98.

Figure 4:
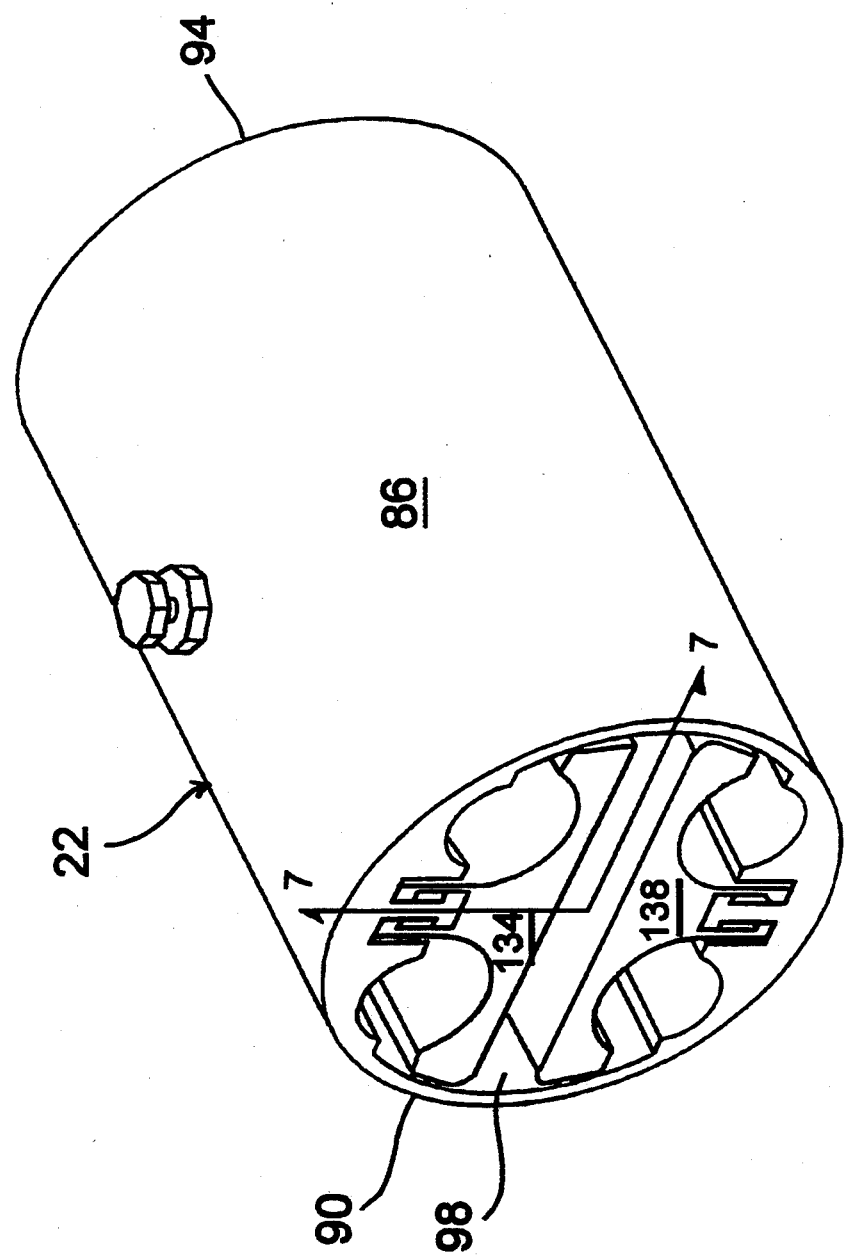
FIG. 4 is an isometric view of an assembled electrical connecting device constructed in accordance with the present invention.

Referring now to FIG. 4, a first conductor clamping plate 134 and a second conductor clamping plate 138 are slidably received within the passage 98 through one of the first or second ends, 90 or 94 respectively. Each of the conductor clamping plates 134 and 138 is made from an electrically non-conductive material and is approximately the same length as the connector body 86.

Figure 5:
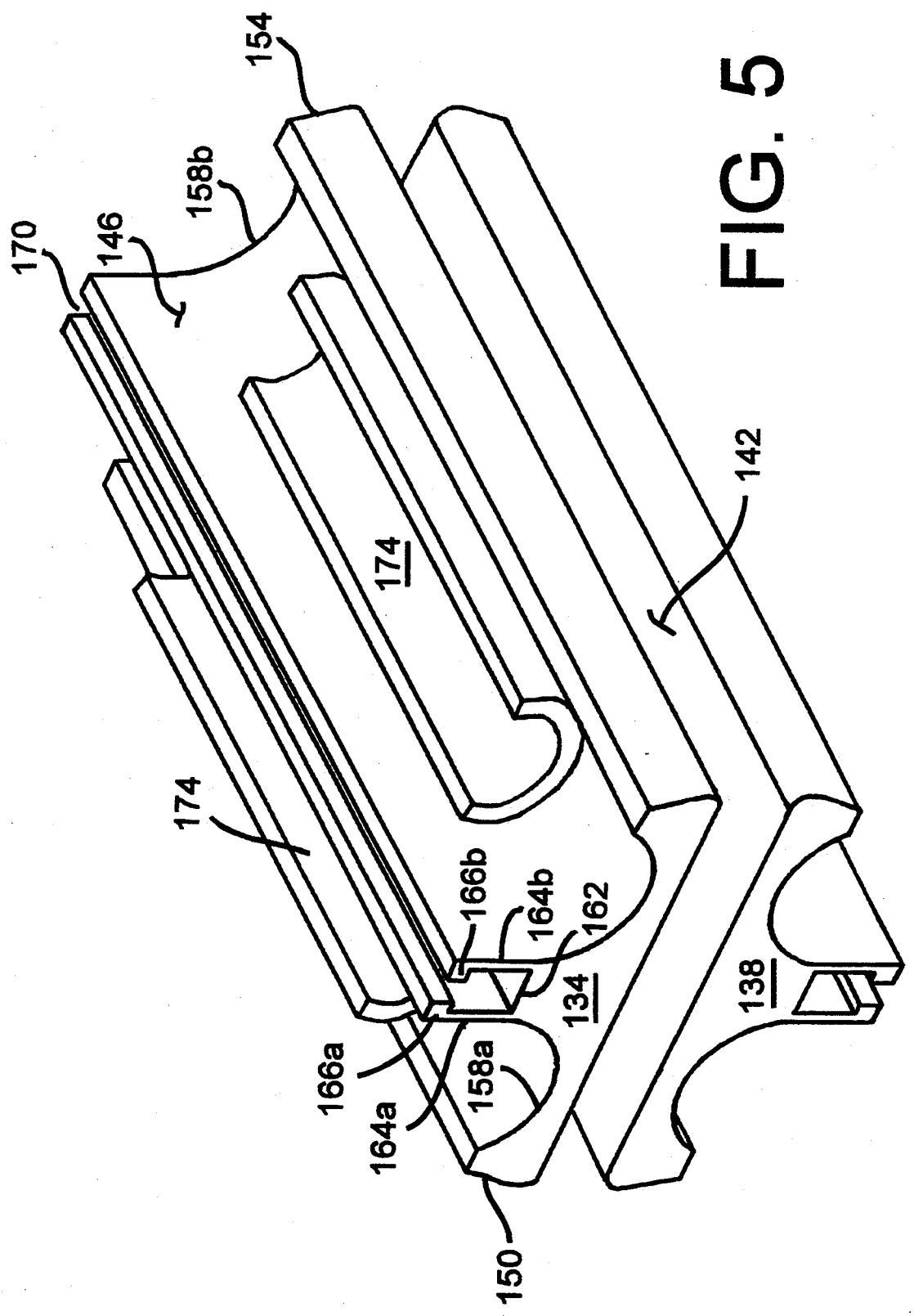
FIG. 5 is an isometric view of the connector clamping plates of the electrical connecting device of the present invention.

Referring now to FIG. 5, the first and second conductor clamping plates, 134 and 138 respectively, are generally identical in construction. Accordingly, the description associated with FIG. 5 will apply to both clamping plates 134 and 138. The clamping plates 134 and 138 have a generally flat surface 142, a clamping surface 146, a first end 150, and a second end 154. The clamping surface 146 defines two generally parallel grooves 158a and 158b extending longitudinally between the first end 150 second end 154. Each of the grooves 158a and 158b has a generally semi-circular cross-sectional shape. Adjacent portions 164a and 164b of the two parallel grooves 158 form a clamping plate retaining slot 162 which also extends between the first and second ends, 150 and 154 respectively and is centered on the longitudinal center line of the clamping plate 134/138, thereby spacing apart and separating the parallel grooves 158a and 158b. The retaining slot 162 is generally U-shaped and has an inside width slightly larger than the width of the top portion 122 of the T-shaped retainer 118 and an outside width slightly smaller that the inside width of the slot 114 (FIG. 3). A pair of inwardly extending legs 166a and 166b at the open end of the retaining slot 162 narrow the width of the slot 162 from both sides, thereby forming a narrow gap 170 at the center of the retaining slot 162. The width of the gap 170 is slightly larger that the width of the leg portion 119 of the T-shaped retainer 118 but smaller that the width of the top portion 122 of the T-shaped retainer 118 (FIG. 3). In other words, the retaining slot 162 is dimensioned to receive the T-shaped retainer 118 with space for limited vertical movement of the top portion 122 of the retainer 118 within the slot 162. An electrical connector 174, made from an electrically conductive material such as copper and having a generally C-shaped cross-section is positioned in each of the grooves 158. The connectors 174 are fixedly attached in the grooves 158 by a suitable means such as an adhesive or a press-to-fit construction. The electrical connectors 174 provide the means for electrically connecting the electrical conductors 42 of the first section 14 with the electrical conductors 66 of the second section 18.

Figure 6:
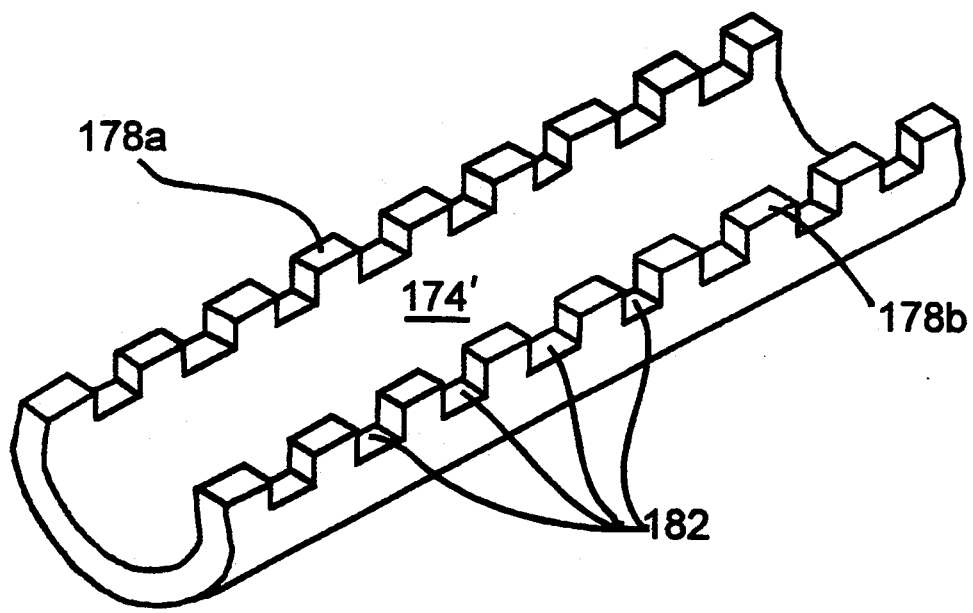
FIG. 6 is an isometric view of an alternate embodiment of an electrical connector of the connecting device of the present invention.

Referring now to FIG. 6, an alternate embodiment of the C-shaped electrical connector 174, designated 174' is shown. Two parallel longitudinal edges 178a and 178b extend the full length of the connector 174'. Notches 182 are evenly spaced along the longitudinal edges 178a and 178b to provide a spring action between the parallel edges 178a and 178b. This spring action helps to make a good electrical connection between the electrical conductors 42 and 66 of the first and second sections, 14 and 18 respectively, and the connector 174'.

Figure 8:
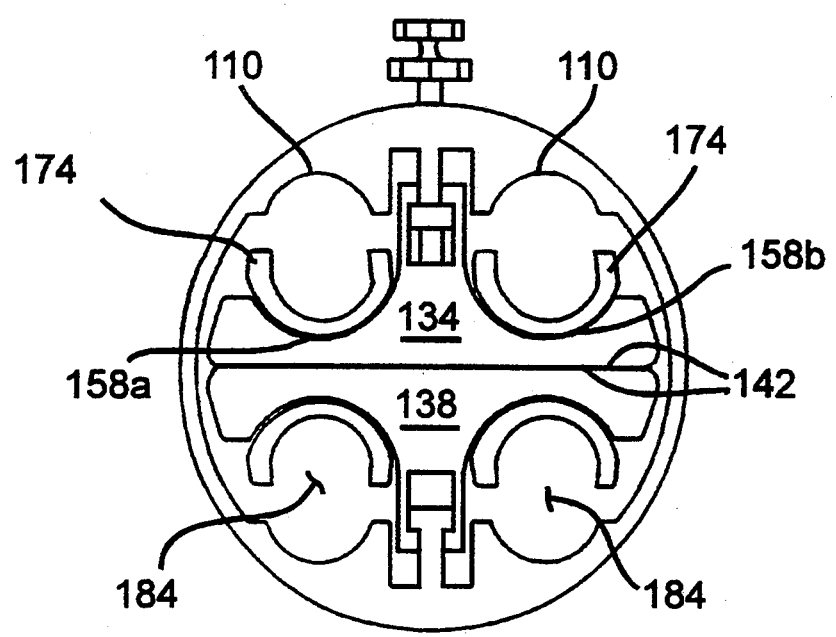
FIG. 8 is an end view of the electrical connecting device of the present invention showing the conductor clamping plates in a first position.
Figure 9:
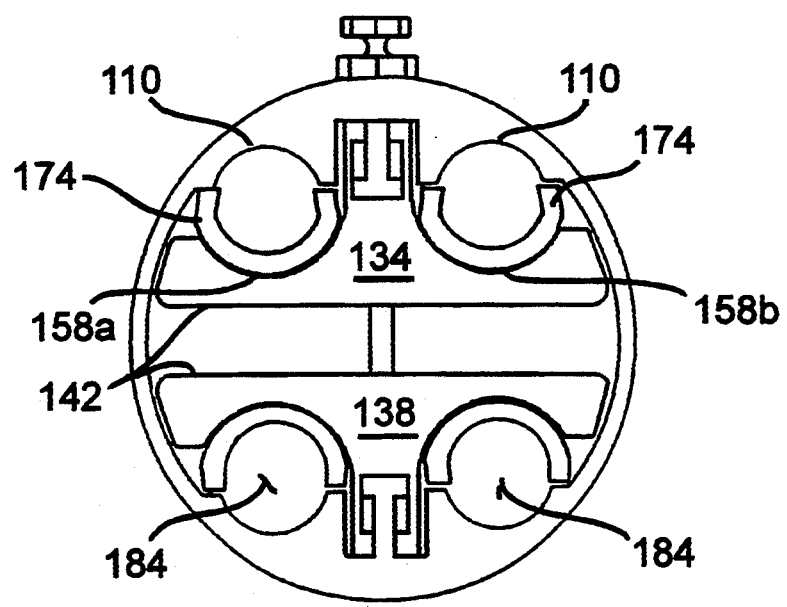
FIG. 9 Is an end view of the electrical connecting device of the present invention showing the conductor clamping plates in a second position.

Referring again to FIGS. 3 and 5, as the conductor clamping plates 134 and 138 are slidably installed in the passage 98, the T-shaped retainers 118 are slidably received within the clamping plate retaining slots 162 while the portions 164a and 164b along with the inwardly extending legs 166a and 166b which form the retaining slots 162 are simultaneously and slidably received within the slots 14 of the passage 98, thereby interlocking the clamping plates 134 and 138 with the passage 98. This interlocking action permits only a limited movement of each of the conductor clamping plates 134 and 138 with respect to the passage 98 and each other. When the clamping plates 134 and 138 are installed in the described manner, each groove 158 in the clamping plates 134 and 138 is aligned or associated with a corresponding channel 110 in the passage 98 to form a conductor receiving pocket 184 as shown in FIGS. 8 and 9. Further, the flat surface 142 of the first conductor clamping plate 134 is in juxtaposed relationship to the flat surface 142 of the second conductor clamping plate 138

Figure 7:
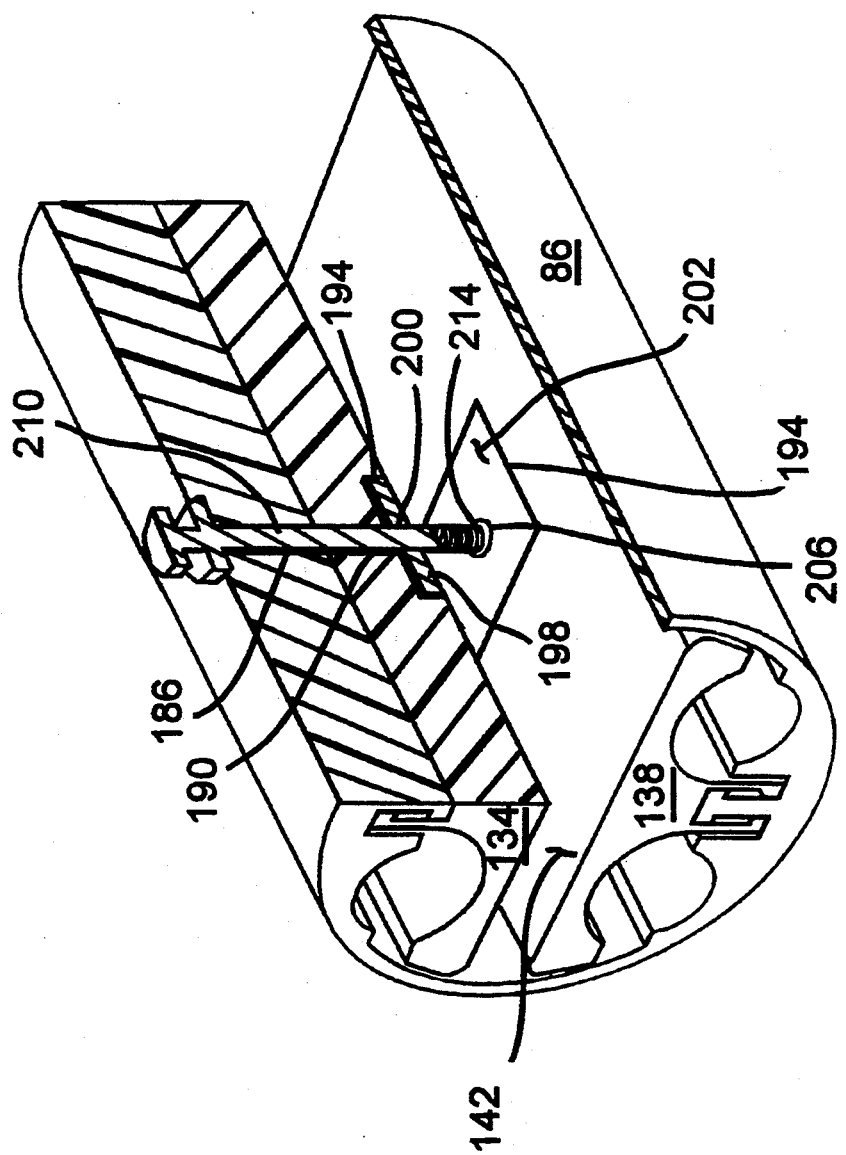
FIG. 7 is a ¼ section view of the connecting device of the present invention taken along lines 7—7 of FIG. 4.

Referring now to FIG. 7, the body 86 includes a bolt hole 186 which is generally perpendicular to the passage 98 and passes through the body 86 along the vertical axis 102 (shown in FIG. 3) at a point approximately half way between the first and second ends, 90 and 94 respectively, of the body 86 of the connector 22. Each of the conductor clamping plates, 134 and 138, includes a bolt hole 190 for communication between the flat surface 142 and the clamping surface 146. The hole 190 is located at a point between the first and second ends, 150 and 154 respectively, corresponding to the position of the bold hole 186 in the body 86 and is generally perpendicular to the flat surface 142 such that when the clamping plates 134 and 138 are received within the passage 98, the holes 186 and 190 are aligned. The flat surface 142 of clamping plates 134 and 138 includes a depression 194, generally centered about the bolt hole 190. The depression 194 of one of the first or second clamping plates, 134 and 138 respectively, receives a threaded plate 198. The threaded plate 198 has a threaded hole 200 proximate the center of the plate such that the threaded hole 200 is generally concentric about the axis of the bolt hole 190. The depression 194 of the other of the first or second clamping plates, 134 and 138 respectively, receives a bearing plate 202. The bearing plate 202 has a semicircular shaped depression 206 proximate its center such that the depression is generally concentric about the axis of the bolt hole 190. The threaded plate 198 and bearing plate 202 are each closely received within one of the depressions 194 and fixedly attached thereto. The bearing plate 202 is positioned such that the semicircular shaped depression 206 faces outward from the flat surface 142. For the purpose of this description the first conductor clamping plate 134 is shown with the threaded plate 198 and the second conductor clamping plate includes the bearing plate 202.

After the clamping plates 134 and 138 have been slidably received within the passage 98, a connector bolt 210 having a threaded end 214 is inserted into the bolt hole 186 of the body. As the threaded end 214 passes further through the bolt hole 186 it enters the clamping surface end of bolt hole 190 of the first clamping plate 134. Passing further into hole 190, the threaded end 214 engages the threaded plate 198 and is then rotated until that the threaded end 214 passes through the threaded plate 198 and engages the bearing plate 202. At this point the clamping plates 134 and 138 are in a first position, illustrated in FIG. 8, with respect to the passage 98. The threaded end 214 is somewhat rounded such that the semicircular shaped depression 206 acts as a bearing surface for the threaded end 214 of the bolt 210 as it is rotated. As the bolt is rotated further in the clockwise direction the first conductor clamping plate 134 is pushed away from the second conductor clamping plate 138 to a second position, illustrated in FIG. 9, with respect to the passage 98.

Referring now to FIGS. 8 and 9, the first and second conductor clamping plates, 134 and 138 respectively, are selectively movable between the first position, shown in FIG. 8, wherein their generally flat surfaces 142 are in close proximity to one another, and the second position, shown in FIG. 9, wherein their generally flat surfaces 142 are spaced apart from one another. Movement between the first and second positions is accomplished by rotating the connector bolt 210 in either the clockwise or counterclockwise direction.

Referring now to FIG. 8, where, in the first position, the flat surfaces 142 of the first and second conductor clamping plates, 134 and 138 respectively, are in close proximity to one another, the opening the pocket increases the distance between the channels 110 and their associated grooves 158 and electrical connectors 172. Referring again to FIG. 1, with the conductor clamping plates 134 and 138 in first position as described above, the contact surfaces 54 of conductors 42 extending outwardly from the second end 38 of first section 14 may be easily inserted into the pockets 184 at the first end 90 of the connecting device 22. At the same time, the contact surfaces 82 of conductors 66 extending outwardly from the first end 58 of second section 18 may be inserted into the pockets 184 at the second end 94 of the connecting device 22.

After the contact surfaces 54 and 82 have been inserted into the pockets 184 of the connecting device 22 as described above, the connector bolt 210 can be turned in the clockwise direction thereby moving the clamping plates 134 and 138 toward the second position shown in FIG. 9. In the second position the pockets 184 are closed, clamping the contact surfaces 54 and 82 between channels 110 and their associated grooves 158 and electrical connectors 174. Thus, an electrical conductor 42 of the first section 14 and a corresponding electrical conductor 66 of the second section, each inserted into the same pocket 184 are electrically connected together.

It will be appreciated by those skilled in the art that the electrical connecting device 22 as described above, could also be used in an electrical distribution system employing multiple individually electrically insulated cables enclosed within a common protective sheath or conduit. In another embodiment, a connecting device in accordance with the present invention could include only one conductor clamping plate to make the required electrical connection between adjoining sections of an electrical distribution system having a limited number of conductors, for example, one or two conductors.

It will be appreciated by those skilled in the art that the invention is not limited in its application to the details of construction described hereinabove or illustrated in the drawings. The invention is capable of other embodiments and of being practiced or being carried out in various other ways. Further, it is to be understood that the phraseology and terminology used herein is for the purpose of description and should not be regarded as limiting.

I claim:

1. A connecting device for electrically connecting the adjacent uninsulated ends of electrical conductors, said connecting device comprising:
    an electrically non-conductive body having a first end, a second end and defining a hollow passage for communicating between said first and second ends;
    a clamping plate, slidably received within said passage such that it extends generally between said first and second ends of said passage, said clamping plate being selectively movable, along an axis substantially perpendicular to a lengthwise axis of said passage between a first position with respect to said passage and a second position with respect to said passage;
    at least one electrical connector, fixedly attached to said clamping plate, said connector extending from a point nearer said first end of said passage to a point nearer said second end of said passage, said connector being dimensioned to receive each of said adjacent ends of said conductors which are axially aligned;
    said at least one electrical connector being constructed of an electrically conductive material; and
    means for selectively moving said clamping plate between said first and second positions.

2. The connecting device of claim 1 wherein said clamping plate is electrically non-conductive.

3. The connecting device of claim 1 wherein said means for selectively moving said clamping plate further comprises:
    a portion of said body defining a hole, said hole being generally perpendicular to the axis of said passage and passing through said body proximate a midpoint between said first and second ends;
    a portion of said clamping plate defining a hole, said hole passing through said clamping plate such that said hole in said body and said hole in said clamping plate are in alignment when said clamping plate is positioned within said passage;
    a threaded plate, being centered about said hole in said clamping plate and fixedly attached thereto; and a connector bolt having a threaded end, said threaded end passing through said hole in said body and entering said hole in said clamping plate such as to be threadably engaged by said threaded plate thereby placing said clamping plate in said first position with respect to said passage, further rotation of said bolt in the clockwise direction moving said clamping plate from said first position with respect to said passage to said second position with respect to said passage.

4. The connecting device of claim 3 wherein in said first position, said clamping plate is spaced apart from said passage thereby permitting the insertion of said adjacent uninsulated ends of the electrical conductors into the first and second ends of said passage.

5. The connecting device of claim 4 wherein, in said second position, said clamping plate is in close proximity to said passage thereby clamping the inserted adjacent uninsulated ends of the electrical conductors between said passage and said electrical connectors such that a conductor inserted in said first end of said passage and a conductor inserted in said second end of said passage, each clamped against a common electrical connector, are electrically connected together.

6. A connecting device for electrically connecting the adjacent uninsulated ends of electrical conductors, said connecting device comprising:
   a body having a first end, a second end and defining a hollow passage for communicating between said first and second ends, said passage being electrically non-conductive;
   a clamping plate, slidably received within said passage and extending generally between said first and second ends of said passage, said clamping plate being electrically nonconductive and selectively movable along an axis substantially perpendicular to a lengthwise axis of said passage between a first position with respect to said passage and a second position with respect to said passage;
   at least one electrical connector, fixedly attached to said clamping plate and extending from a point nearer said first end of said passage to a point nearer said second end of said passage, said connector being made from an electrically conductive material and dimensioned to receive said adjacent ends of said conductors; and
   means for selectively moving said clamping plate between said first and second positions.

7. The connecting device of claim 6 wherein said means for selectively moving said clamping plate further comprises:
   a portion of said body defining a hole, said hole being generally perpendicular to the axis of said passage and passing through said body proximate a midpoint between said first and second ends;
   a portion of said clamping plate defining a hole, said hole passing through said clamping plate such that said hole in said body and said hole in said clamping plate are in alignment when said clamping plate is positioned within said passage;
   a threaded plate, being centered about said hole in said clamping plate and fixedly attached thereto; and
   a connector bolt having a threaded end, said threaded end passing through said hole in said body and entering said hole in said clamping plate such as to be threadably engaged by said threaded plate thereby placing said clamping plate in said first position with respect to said passage, further rotation of said bolt in the clockwise direction moving said clamping plate from said first position with respect to said passage to said second position with respect to said passage.

8. The connecting device of claim 7 wherein said clamping plate, in said first position, is spaced apart from said passage, thereby permitting the insertion of adjacent ends of the electrical conductors into said first and second ends of said passage.

9. The connecting device of claim 8 wherein said clamping plate, in said second position, is in close proximity to said passage thereby clamping the inserted adjacent ends of the electrical conductors between said passage and said electrical connectors such that a conductor inserted in said first end of said passage and a conductor inserted in said second end of said passage, each clamped against a common electrical connector are electrically connected together.

10. An electrical connecting device for electrically connecting a plurality of electrical conductors of a first section of a multi-phase electrical distribution system to a plurality of corresponding electrical conductors of a second adjacent section of the multi-phase electrical distribution system, said electrical connecting device comprising:
    a body having a first end and a second end, said body defining a passage for communicating between said first and second ends, said passage further defining a plurality of generally parallel channels, each said channel extending between said first and second ends of said body;
    a pair of conductor clamping plates, each having a first end, a second end, a generally flat surface and a clamping surface, said clamping surface further defining two parallel spaced apart grooves, said grooves extending between said first and second ends, said clamping plates being slidably received within said passage;
    a plurality of electrical connectors, each fixedly attached within one of said grooves of said conductor clamping plates; and
    means for selectively moving said conductor clamping plates between a first position with respect to said passage and a second position with respect to said passage.

11. The electrical connecting device of claim 10 wherein said passage is electrically non-conductive.

12. The electrical connecting device of claim 10 wherein said channels have a generally semi-circular cross-section.

13. The electrical connecting device of claim 10 wherein said conductor clamping plates are electrically non-conductive.

14. The electrical connecting device of claim 10 wherein said grooves have a generally semi-circular cross-section.

15. The electrical connecting device of claim 10 wherein said electrical connectors have a generally C-shaped cross-section and are made from an electrically conductive material.

16. The connecting device of claim 10 wherein said means for selectively moving said clamping plate further comprises:
    a portion of said body defining a hole generally perpendicular to the axis of said passage and passing though said body at a point proximate a midpoint between said first and second ends;

a portion of each said clamping plate defining a hole for communicating between said clamping surface and said flat surface, said hole in said body and said hole in said clamping plate being in alignment after installing said clamping plate in said passage;

a threaded plate, centered on said hole of one of said clamping plates and fixedly attached to said flat surface of that clamping plate;

a bearing plate, centered on said hole of the other said clamping plates and fixedly attached to said flat surface of that clamping plate; and a connector bolt having a threaded end, said threaded end passing through said hole in said body and entering said hole in said clamping surface of the first said clamping plate having said threaded plate, said bolt end threadably engaging said threaded plate and passing there through such as to engage said bearing plate of the other clamping plate, whereby said clamping plates are in said first position, and whereby further rotation of said bolt in a preselected direction effects moving said clamping plates from said first position to said second position.

17. The connecting device of claim 16 wherein, in said first position, said clamping plates are in close proximity to each other and said grooves and their associated electrical connectors are spaced apart from said channels in said passage thereby permitting the insertion of adjacent ends of the electrical conductors into said first and second ends of said passage.

18. The connecting device of claim 17 wherein in said second position, said clamping plates are spaced apart one from the other such that said grooves and their associated electrical connectors are in close proximity to said channels in said passage thereby clamping the inserted adjacent ends of the electrical conductors between said channels and said electrical connectors such that a conductor inserted in said first end of said passage and a conductor inserted in said second end of said passage, each clamped against a common electrical connector, are electrically connected together.

19. An electrical connecting device for electrically connecting a plurality of electrical conductors of a first section of a multi-phase electrical distribution system to a plurality of corresponding electrical conductors of a second adjacent section of the multi-phase electrical distribution system, said electrical connecting device comprising:

a body having a first end and a second end, said body defining a passage for communicating between said first and second ends, said passage further defining a plurality of generally parallel channels, each said channel extending between said first and second ends of said body;

a pair of conductor clamping plates, each having a first end, a second end, a generally flat surface and a clamping surface, said clamping surface further defining two parallel spaced apart grooves, said grooves extending between said first and second ends, said clamping plates slidably received within said passage such that said flat surfaces of each clamping plate are in a juxtaposed relationship with one another;

a plurality of electrical connectors, each fixedly attached within one of said grooves of said conductor clamping plates;

a plurality of conductor receiving pockets, each formed by one of said channels of said passage and a corresponding one of said grooves of one of said clamping plates, each said pocket being partially defined by one of said electrical connectors;

means for selectively moving said conductor clamping plates between a first position wherein said pockets are substantially open and a second position wherein said pockets are substantially closed; and means for interlocking said clamping plates within said passage such that movement of said clamping plates with respect to said passage is limited.

20. The connecting device of claim 19 wherein said passage is electrically non-conductive.

21. The connecting device of claim 19 wherein said channels are generally semi-circular in cross-section.

22. The connecting device of claim 19 wherein said clamping plates are electrically non-conductive.

23. The connecting device of claim 19 wherein said grooves are generally semi-circular in cross-section.

24. The connecting device of claim 19 wherein said electrical connectors are made from an electrically conductive material.

25. The connecting device of claim 24 wherein said electrical connectors have a generally C-shaped cross-section.

26. The connecting device of claim 25 wherein each of said electrical connectors has two parallel longitudinal edges.

27. The connecting device of claim 26 wherein said two parallel longitudinal edges of each said electrical connector includes equally spaced apart notches for providing a spring effect between said two parallel edges of each said electrical connector.

28. The connecting device of claim 19 wherein said means for interlocking further comprises:

a portion of said passage defining a slot having a generally U-shaped cross-section and being open to the center of said passage, said slot having a predetermined inside width and running longitudinally from said first end of said body to said second end of said body; and a T-shaped retainer, integrally formed from a portion of said passage is centered in and extending outwardly into said slot, said T-shaped retainer running longitudinally between said first and second ends of said body; and a top portion of said T-shaped retainer having a preselected width such that said top portion closes off the open end of said slot leaving a narrow passage on each side of said top.

29. The connecting device of claim 28 wherein said means for interlocking further comprises:

a portion of said clamping plate defining a retaining slot, generally U-shaped in cross-section with an open end and having a preselected outside width and a preselected inside width; and a pair of inwardly extending legs at its open end, said legs reducing said preselected inside width of said slot proximate said open end.

30. The connecting device of claim 29 wherein said preselected outside width of said retaining slot is less than said preselected inside width of said slot in said passage and wherein said preselected inside width of said retaining slot is greater than said preselected width of said top of said T-shaped retainer.

31. The connecting device of claim 30 wherein said retaining slot of said clamping plate is slidably received within said slot of said passage such that said inwardly extending legs and said top of said T-shaped retainer interlock one with the other thereby limiting the movement of said clamping plate with respect to said passage.

32. The connecting device of claim 19 wherein said means for selectively moving further comprises:
a portion of said body defining a hole, said hole passing through said body such that it is generally perpendicular to the axis of said passage and located proximate a midpoint between said first and second ends.

33. The connecting device of claim 32 wherein said means for selectively moving further comprises:
a portion of each said clamping plate defining a hole, said hole being generally perpendicular to said flat surface and communicating between said clamping surface and said flat surface at a point proximate a midpoint between said first and second ends, said hole in said body and said holes in said clamping plates being in alignment after installing said clamping plates in said passage.

34. The connecting device of claim 33 wherein said means for selectively moving further comprises:
a threaded plate, said plate being centered about said hole in one of said clamping plates and fixedly attached to said flat surface thereof.

35. The connecting device of claim 34 wherein said means for selectively moving further comprises:
a bearing plate, said bearing plate being centered about said hole in the other said clamping plate and fixedly attached to said flat surface thereof.

36. The connecting device of claim 35 wherein said means for selectively moving further comprises:
a connector bolt having a threaded end, said threaded end passing through said hole in said body and entering said hole in said clamping surface of said one clamping plate having said threaded plate, said bolt end threadably engaging said threaded plate and passing therethrough such as to engage said bearing plate of said other clamping plate, whereby said clamping plates are in said first position, and whereby further rotation of said bolt in a preselected direction effects moving said clamping plates from said first position to said second position 37. The connecting device of claim 19 wherein, in said first position, said clamping plates are in close proximity to each other such that said grooves and their fixedly attached electrical connectors are spaced apart from said associated channels in said passage thereby permitting the insertion of adjacent uninsulated ends of the electrical conductors of the first and second sections of said multi-phase electrical distribution system into said pockets through said first and second ends of said passage.

38. The connecting device of claim 37 wherein, in said second position, said clamping plates are spaced apart one from the other such that said grooves and their fixedly attached electrical connectors are in close proximity to said associated channels in said passage thereby clamping the inserted adjacent uninsulated ends of the electrical conductors of the first and second sections between said channels and said electrical connectors such that a conductor of the first section inserted in one said pocket at said first end of said passage and a conductor of the second section inserted in the same said pocket at said second end of said passage are electrically connected together.

* * * * *